Dec. 5, 1944.　　　F. G. SILVA　　　2,364,169
AUTOMATIC SCREW MACHINE
Original Filed Oct. 11, 1941　　6 Sheets-Sheet 1
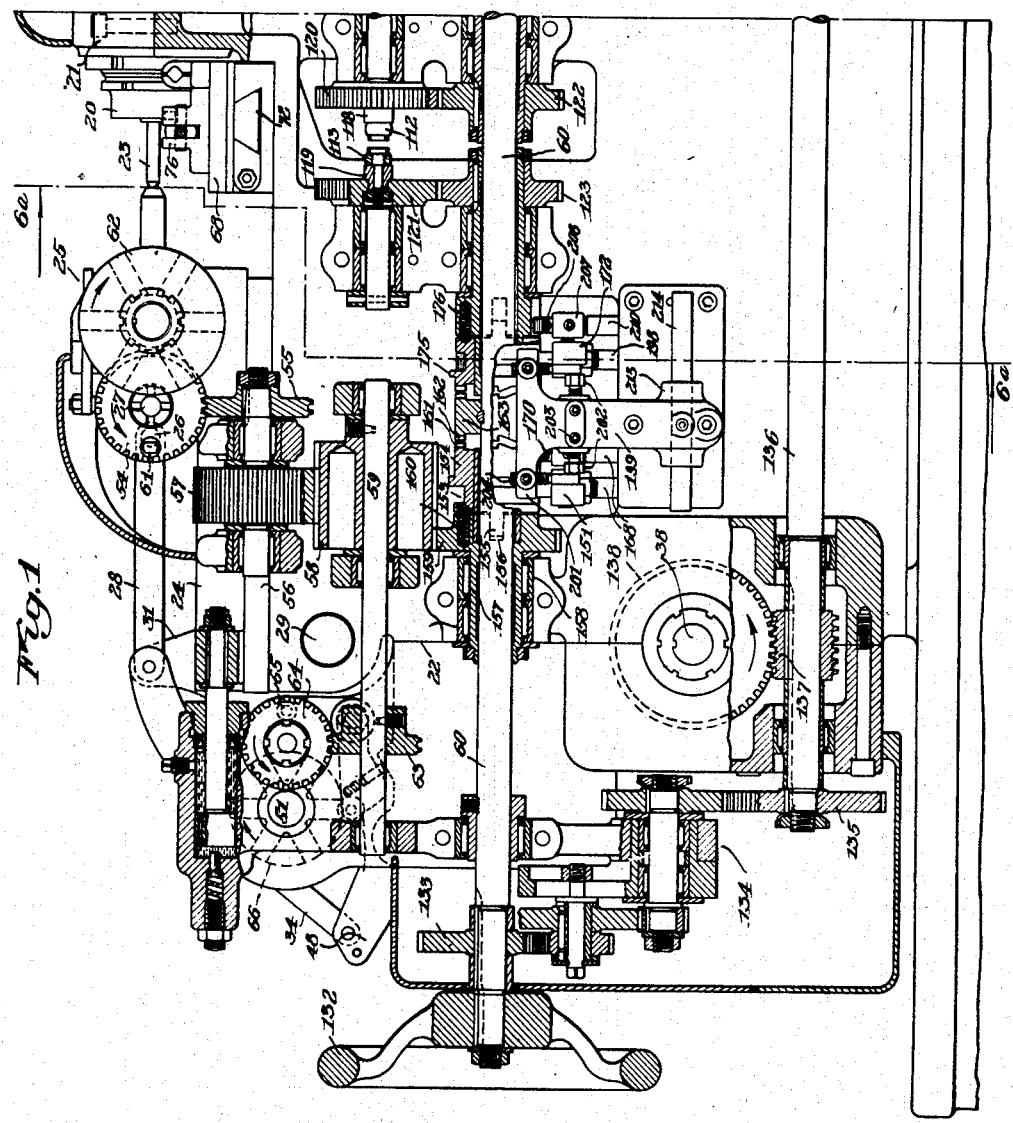
INVENTORS
Frederick G. Silva
Wray S. Seymour
BY
their ATTORNEYS

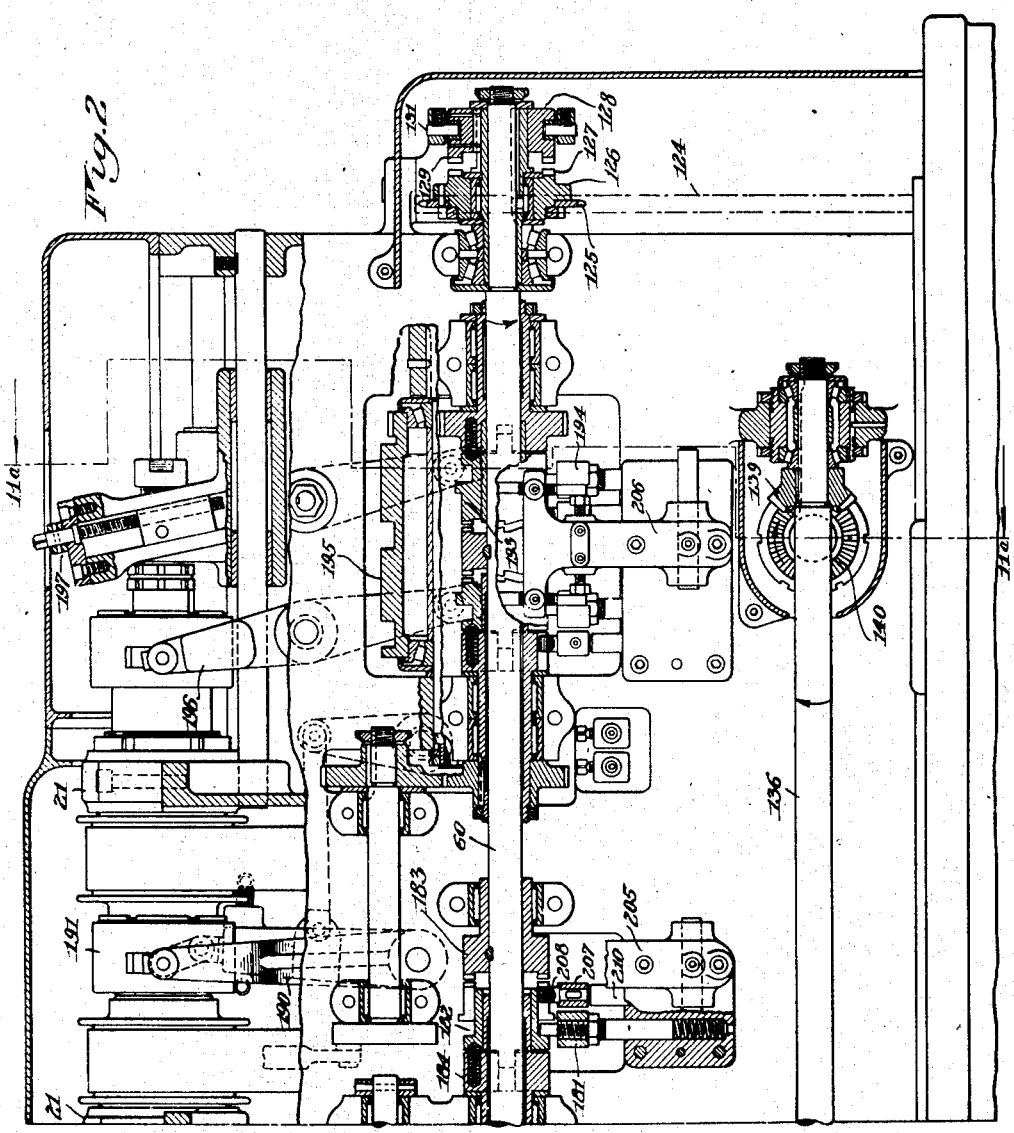

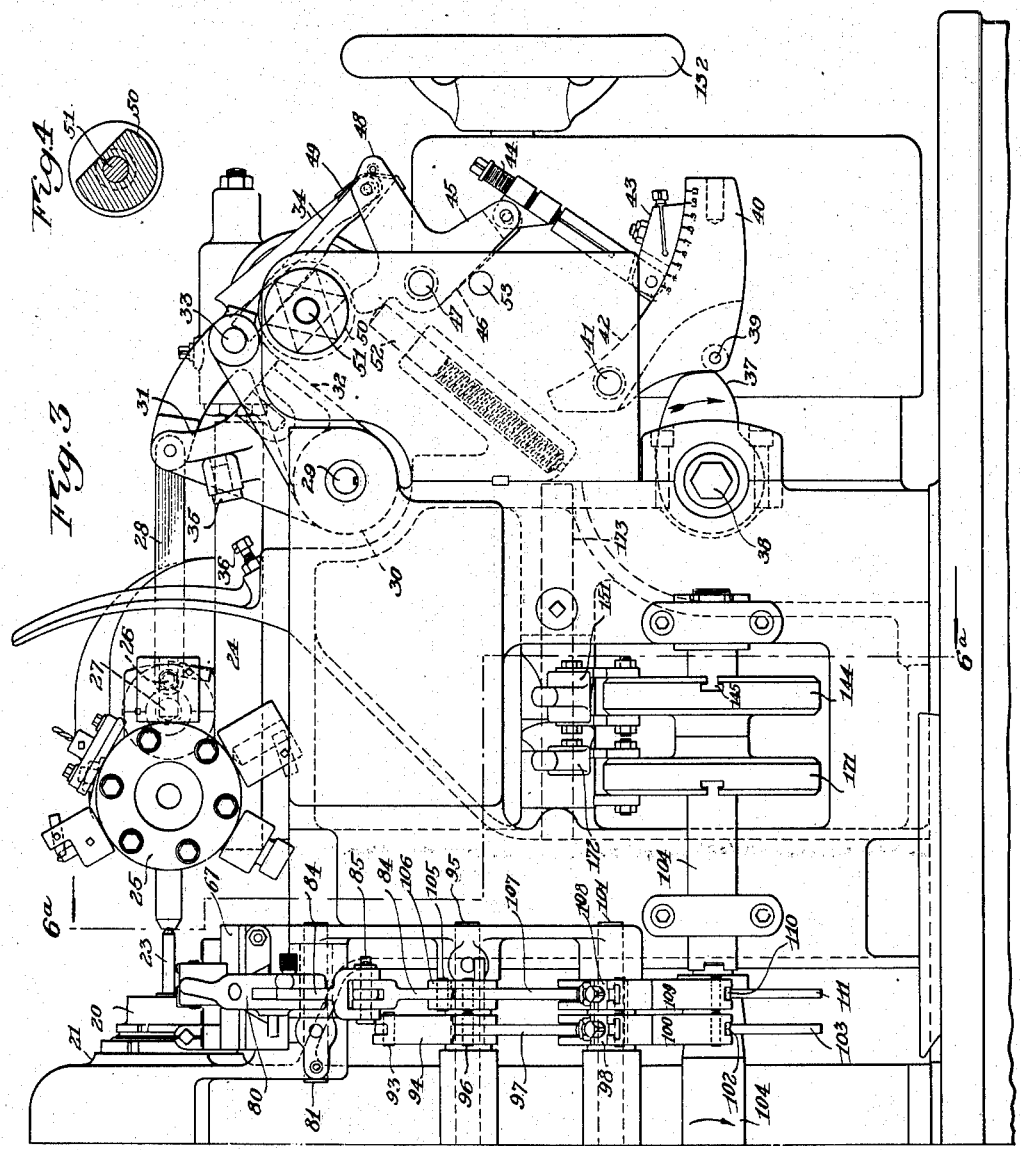

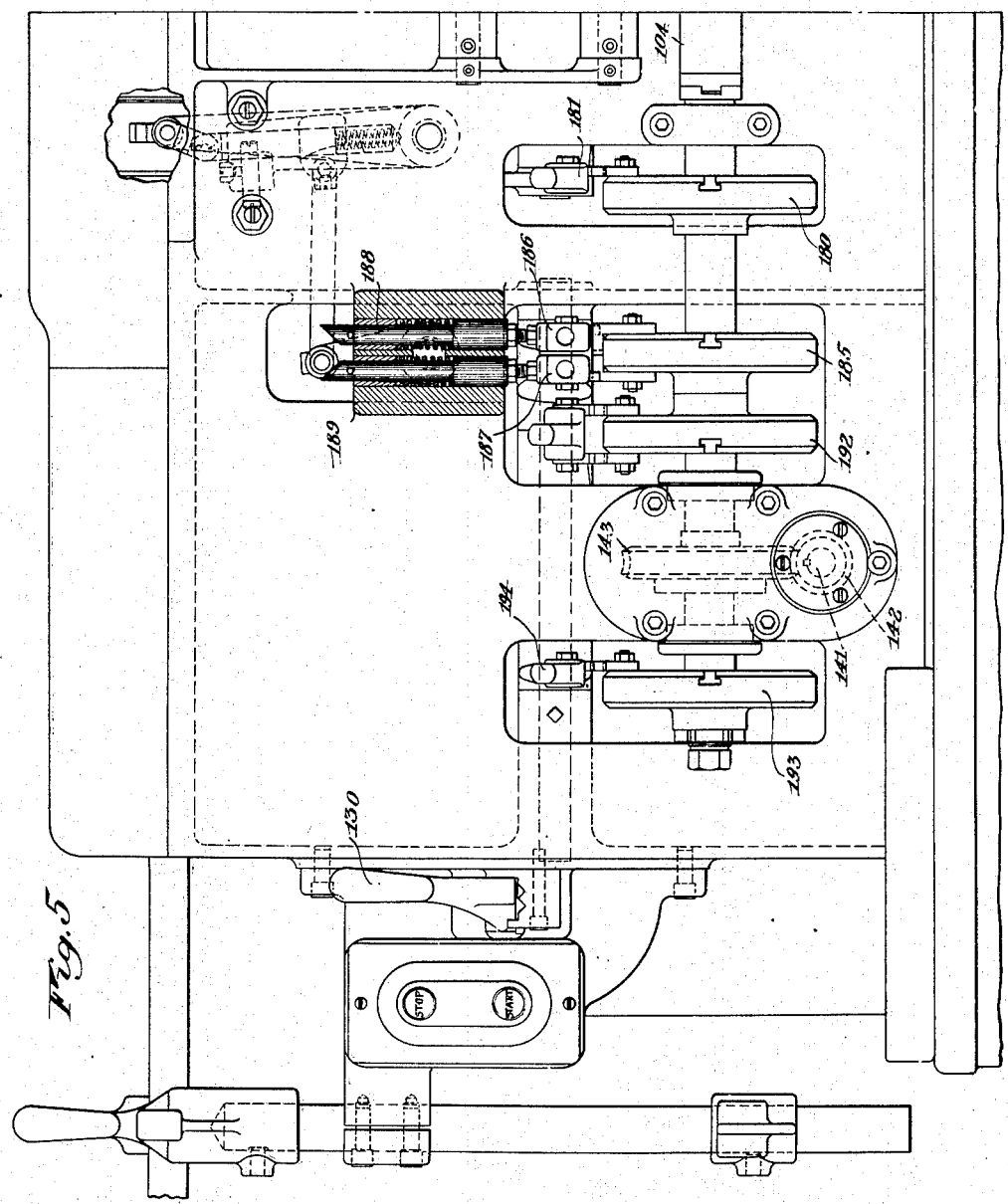

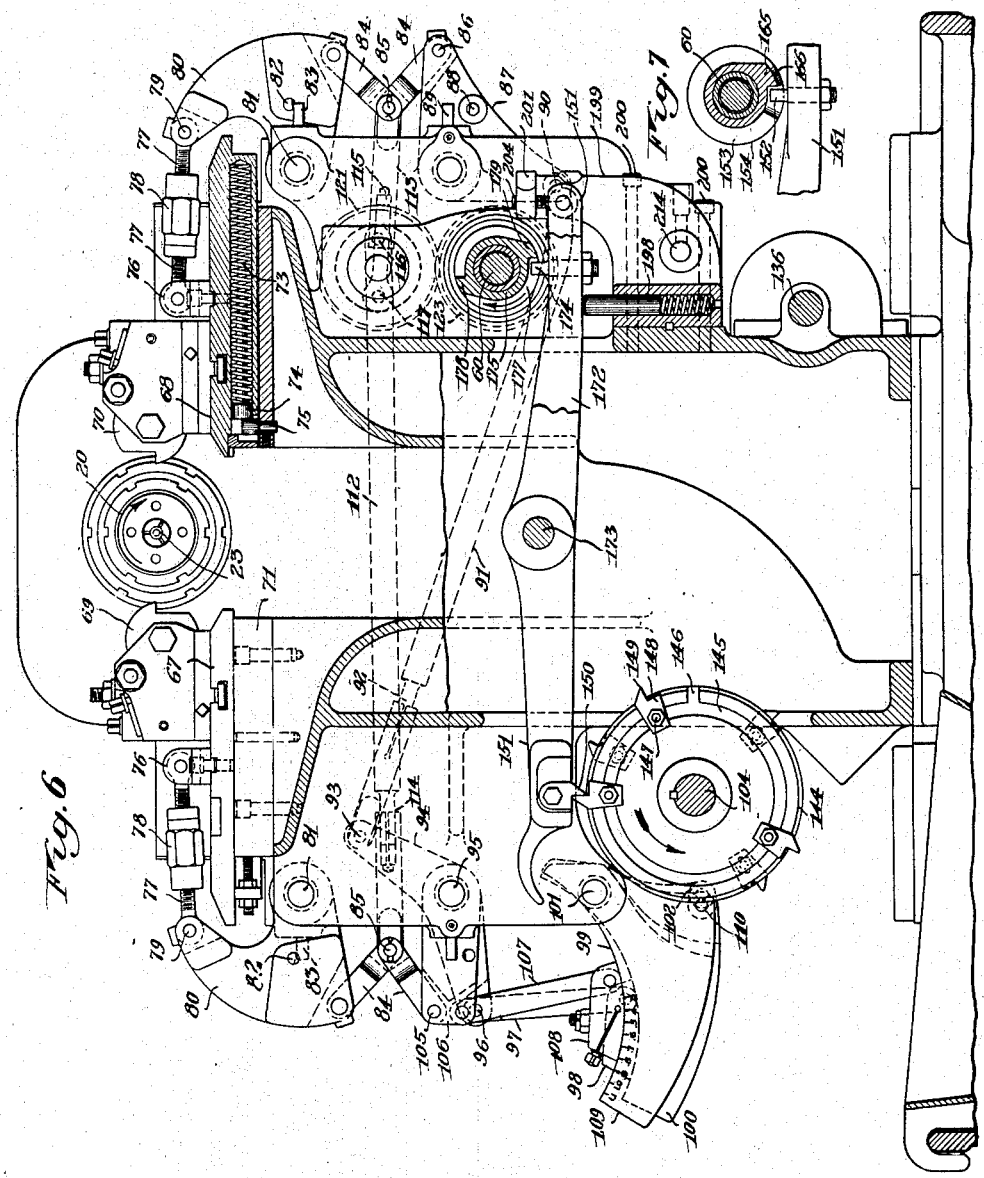

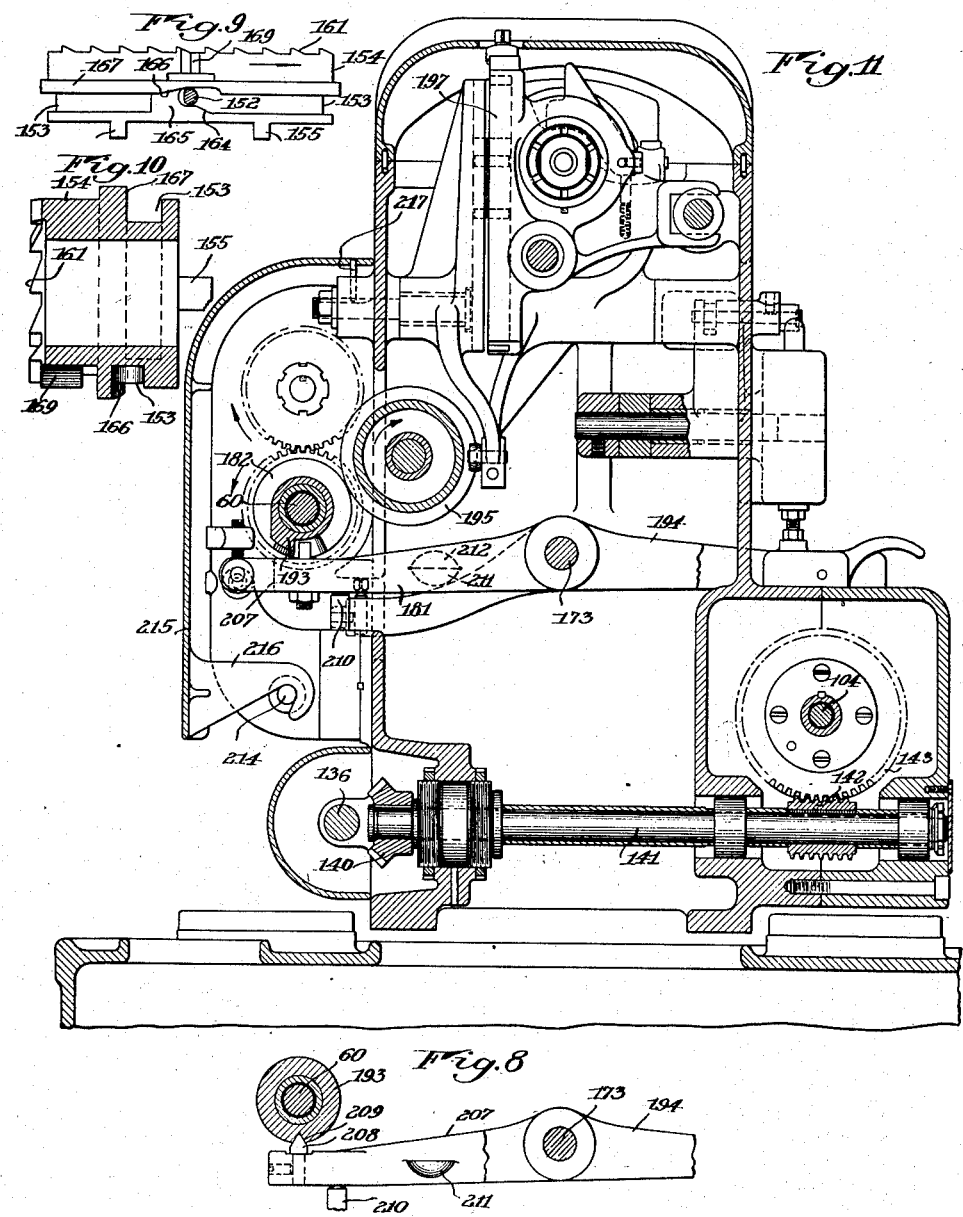

Patented Dec. 5, 1944

2,364,169

UNITED STATES PATENT OFFICE 2,364,169

AUTOMATIC SCREW MACHINE

Frederick G. Silva and Wray S. Seymour, Rochester, N. Y., assignors to Davenport Machine Tool Co., Inc., Rochester, N. Y., a corporation of New York Original application October 11, 1941, Serial No. 414,626. Divided and this application November 15, 1943, Serial No. 510,260

12 Claims. (Cl. 29—44)

This invention relates to automatic screw machines and, more particularly, to mechanism for operating and controlling the component parts thereof, including the cross slides, in accurately timed relation with one another, one object of the invention being to provide a more simple, rapid, and convenient machine of the above character.

Another object is to provide a more compact, yet accessible construction and arrangement of the mechanism, for the purpose of simplifying and facilitating the setting up, adjustment and operation of the machine.

Another object is to provide an improved system of operating connections between the usual trip dog carrier shaft, through the controlling clutches, to the cross slides, for operating the same with increased speed and precision.

A further object is to provide a machine of the above character with improvements in the construction and arrangement of various parts, such as the lever and cam means, actuated by the trip dog carriers, for operating the tool carriers such as the cross slides.

To these and other ends the invention resides in certain improvements and combinations of parts, all as will be hereinafter more fully described, the novel features being pointed out in the claims at the end of the specification.

In the drawings:

Fig. 1 is an elevation, partly in section, through the main or hand wheel shaft, from the rear side of the horizontal turret end of a machine embodying the present invention;

Fig. 2 is a similar view from the rear side of the other or work spindle end of the machine, in continuation of Fig. 1;

Fig. 3 is an elevation of the front side of the horizontal turret end, showing the cross slide mechanism;

Fig. 4 is a sectional detail of a part shown in Fig. 3;

Fig. 5 is an elevation, partly in section, from the front side of the work spindle end, in continuation of Fig. 3;

Fig. 6 is a sectional elevation, substantially on the line 6a—6a in Fig. 3, showing the cross slides and actuating mechanism;

Fig. 7 is a detailed sectional view of portions of a trip lever and the cam mechanism controlled thereby;

Fig. 8 is a detailed view, partly in section and broken away, showing a stop mechanism for the clutch parts operated by the trip levers;

Fig. 9 is a development of the cam slot in one of the controlling clutch parts;

Fig. 10 is a vertical, central section of one of the clutch parts, showing the cam slot therein, and Fig. 11 is a vertical sectional view through the machine, on the line 11a—11a in Fig. 2, showing the trip lever and clutch parts embodying the invention.

The present invention is an improvement upon the automatic screw machine covered by the co-pending patent application of Frederick G. Silva and William S. Davenport, Serial No. 386,130, filed March 31, 1941, Automatic forming machine, and this application is a division of the co-pending application of Frederick G. Silva and Wray S. Seymour, Serial No. 414,626, filed October 11, 1941, Automatic screw machine. The invention herein described and claimed resides in improvements in the construction, arrangement and operation of parts of the mechanism disclosed in said application, Serial No. 386,130, and reference is made to said co-pending applications for a more complete description of the construction and arrangement of parts employed in the complete machine but forming no part of this invention.

The present invention is embodied, by way of illustration, in an automatic screw machine comprising the usual, or any suitable, single work spindle, and horizontal turret and cross slides carrying the tools which are advanced in predetermined sequence for operation on the work piece as it is rotated and fed by the spindle. Mechanism is provided for indexing, advancing and retracting the horizontal turret, advancing and retracting the cross slides, and for reversing and changing the speed of the work spindle, as well understood in the art, and the present invention provides improved mechanism for accomplishing such operations in precisely coordinated sequences.

The work spindle, indicated generally at 20 (Fig. 1), is rotatably mounted in bearings 21 on the main frame 22 of the machine and comprises the usual or any suitable spindle assembly for rotating and feeding the work piece 23 for the sequential cutting operations by the tools, as well understood in the art and as hereinafter further described.

The horizontal turret mechanism preferably comprises a slide 24 supported on guideways on the main frame, for movement, as usual, toward and from the work spindle, longitudinally of the axis of the spindle. The slide carries a horizontal turret 25, of the known or any suitable variety, having a peripheral series of sockets in which different tools are mounted for successive presentation to the work by the rotary indexing of the turret in bearings on its slide.

The mechanism for moving the turret slide toward and from the work, for indexing the turret between successive cutting operations, comprises, preferably, a rapidly operating crank and rod device, the rod being further actuated by cam means, while the slide is advanced, for effecting the feeding movement of the turret for cutting operation of the tools. The crank is shown at 26 (Fig. 3) on the shaft 27 rotated in bearings on the slide by means hereafter described, the rod being shown at 28 as having a rotary connection at one end with the crank. The other end of the connecting rod is connected with and actuated by a lead cam shaft mechanism, which forms no part of the present invention and needs only the following brief description.

Fixed on the main frame is a shaft 29 on which a hub 30 is mounted for rocking movement. Extending integrally from the hub is an arm 31 with which the rod 28 is connected. Other integral arms 32 carry a cylindrical bar 33 for engagement, selectively, by a series of cam driven actuators 34. At 35 on the hub is an abutment arranged for engagement with an adjustable stop part 36 on the frame, for limiting the movement of the hub in the forward direction, and it will be seen that as the slide crank 26 is rotated through 180°, its connecting rod 28 rocks hub 30 until stopped by its abutment 35, at the same time rapidly retracting the turret slide, said mechanism affording a positive withdrawal of the turret and its tool to a position in which the turret may be indexed by suitable mechanism.

The present machine preferably comprises a series of lead cams 37 for the horizontal turret, spaced from one another longitudinally of a cam shaft 38, as fully described in said application, Serial No. 386,130. Each cam engages a roller 39 on a corresponding lever 40, one for each cam, each of such levers being pivoted at 41 on the main frame and rocked in accordance with the shape and proportions of its corresponding cam. Lever 40 is formed with a slotted, arcuate surface 42 on which a block 43 is slidably adjustable to vary the amplitude of throw of the cam. Pivoted to each block is a rod 44 which has pivoted thereto, at a longitudinally adjustable point, one arm 45 of a bell crank lever 46 pivoted at 47 on the frame. The other arm 48 of each of the levers 46 is pivotally connected with one of the actuators 34, which latter are normally depressed by springs 49 into engagement with a controlling disk assembly indicated generally at 50 on a shaft 51.

The disk assembly 50 serves to connect the lead cams and their respective actuators 34, individually and selectively, with the turret slide, to rapidly control the feeding actuation of the various tools in succession by connection with those portions only of the respective cams which may be required for that purpose. It preferably comprises for each actuator 34, a circular disk flattened at one side, as shown in Fig. 4, and each disk supports the corresponding actuator with its notched free end raised above the bar 33, until the flattened portion of the disk allows the actuator end to drop down into position to engage the bar 33. The disk shaft 51 is indexed, by any known or suitable mechanism, in timed relation with the indexing of the turret, so that as each tool is brought to operating position, one of the actuators 34 is brought to position to engage bar 33 for rocking the hub 30 and feeding the tool to cut the work under control of the particular cam corresponding to such tool and the particular portion of the rise of the cam required to effect the cutting action.

A spring actuated plunger 52 normally holds each bell crank lever 46 against a stop 53 on the frame, except as the lever may be held above the stop by its corresponding cam 37. It will be apparent from the above description that as crank 26 is rotated through 180° to retract the slide, and the turret is indexed and the crank is again rotated to advance the slide, bar 33 will be moved rearwardly into engagement with the corresponding actuator 34 selected as described, thus establishing a positive connection between one of the cams 37 and the turret slide, corresponding to the particular tool indexed to operating position. Continued rotation of the crank 26 through 180° then rapidly advances the slide and turret into proximity with the work and the selected cam then advances the tool to perform the cutting operation. By suitably timing the indexing of the turret and the selecting disks for the actuators, the tools may be rapidly operated, one after another, by the useful rising portions only of the respective cams.

The means for intermittently rotating crank 26 for reciprocating the turret slide comprises, preferably, an angular gear 54 fixed on the crank shaft 27 and mating with a gear 55 fixed on a shaft 56. The shaft has fixed thereon a spur gear 57 meshing with an elongated spur gear 58 fixed on a shaft 59 and driven by a geared connection with the main or hand wheel shaft 60 of the machine.

The means for indexing the turret comprises, preferably, a spur 61 on gear 54 coacting with a series of radial slots formed in an index wheel 62 fixed on the turret shaft. Spur 61, rotating with the crank 26, cooperates with the index wheel to index the turret from tool to tool in the usual fashion.

The means for indexing the disk assembly 50 for selecting the actuators 34 comprises, preferably, an angular gear 63 fixed on shaft 59 and mating with a gear 64 which carries a spur 65 cooperating with an index wheel 66 fixed on the shaft 51 of the selector disk assembly. The described connections between the means for rotating crank 26 and actuating the indexing mechanisms for the turret and selector disk assembly, 50, insure the operation of such parts in precisely timed relation with each other. Suitable devices are provided for cushioning the motions of the turret slide and centering the turret and selector assembly in their index positions, but such devices form no part of the present invention.

The cross slide mechanism comprises, preferably, a front slide 67 (Figs. 3 and 6) and a rear slide 68 (Figs. 1 and 6). These slides are adapted to carry tools of the usual character, as indicated at 69, 70, and slide in ways 71 and 72, respectively, on opposite sides of the machine frame. A spring 73 (Fig. 6) housed in a bore in each slide, presses at one end 74 against a stop 75 on the frame to aid in retracting the slide.

The means for positively actuating the cross slides preferably comprises a lug 76 on the top of each slide to which is pivotally connected a link 77, preferably including a turnbuckle 78, for adjusting its length to control the position of the slide. The outer end of the link is pivotally connected at 79 with one arm of a lever 80 extending over the outer end of the slide, as shown. Lever 80 is pivoted on the frame at 81 and carries a stop pin 82 arranged to engage an abutment 83 on the frame, to limit the outward movement of the slide, the above parts being the same for each of the cross slides.

Means are provided for rapidly actuating each cross slide lever 80, in conjunction with cam means for producing the feeding actuation for cutting the work. Such means comprises, preferably, a pair of toggle levers 84 for each slide (Fig. 6), one lever of each pair being pivoted at one end to the slide lever 80. The links of each pair have a pivotal knee connection with each other at 85, at which point a means, hereafter described, is also connected for rapidly straightening and breaking the toggle to effect quick movement of the slide.

The cam actuated means for effecting the feeding movement of the two cross slides are substantially the same. The rear slide 68 has the opposite end of its pair of toggle links pivoted at 86 to one arm of a bell crank lever 87 provided with a stop pin 88 positioned for contact with a frame abutment 89 to limit the retracting movement of the lever. The opposite arm of the lever is pivotally connected at 90 with a link 91, having any known or suitable means, such as the threaded joint indicated at 92, for adjusting its length. The opposite end of link 91 is pivoted at 93 to one arm of a bell crank lever 94 pivoted on the frame at 95 and having its other arm pivoted at 96 to a link 97 which is pivotally connected with a block 98 sliding in a T-slot connection with the arcuate surface 99 of a lever 100 pivoted on the frame at 101 and carrying a roller 102 coacting with a cam 103 (Fig. 3) fixed on a cross slide cam shaft 104.

The front cross slide 67 has its toggle levers pivotally connected at 105 with a lever 106 pivoted on the frame at 95. Pivoted to the lever 106 is a link 107 pivotally connected with a block 108 having a slidably adjustable T-slot connection with an arcuate bearing surface on a lever 109 having a roller 110 bearing on a cam 111 on shaft 104 (Fig. 3), as in the case of the opposite slide. By selecting suitable cams, adjusting the blocks 98 and 108 on the cam levers to control their effective throw and adjusting the lengths of the links 77, the feeding action of the cross slides is precisely controlled in position and amplitude.

The means for straightening and breaking the toggles of the cross slides comprises a pair of links 112 and 113 (Fig. 6), respectively, provided with any known or suitable means, such as the threaded joints indicated generally at 114 and 115, respectively, for adjusting their lengths. One end of each link is pivotally engaged with the knee section 85 of the corresponding toggle. The opposite ends of the links are pivotally connected at 116 and 117, respectively, with cranks 118 and 119 (Fig. 1) on gears 120 and 121, respectively, which mate with gears 122 and 123, which latter are intermittently clutched to the main shaft 60, by means hereafter described.

By the above described means, comprising the cranks 118 and 119, and links 112 and 113, the toggles are straightened to rapidly advance the cross slides and, as they are straightened, the cams 111 and 103, through their described connections, comprising the toggles, give to the slides the further feeding motion required for the desired cutting operation on the work, in a rapid and precisely controlled manner. As will be noted, the cross slide mechanism is relatively simple and strong in construction and is compactly but accessibly arranged at the sides of the machine. The toggle cranks 118 and 119 are rigidly supported on the frame intermediate the toggles and, when simultaneously operated, tend to counterbalance the stresses produced, in the operation of the toggles.

The mechanism for driving the several parts of the machine in timed coordination with one another comprises, preferably, the said main or hand wheel shaft 60 preferably driven by an electric motor (not shown) within the main frame. A sprocket chain 124 (Fig. 2) leads from a sprocket wheel rotated by said motor to a sprocket wheel 125 fixed on a hub 126 riding idly on the shaft and having a lateral clutch face 127. Splined on the shaft is a hub 128 having a cooperating clutch face 129 for clutching the sprocket to the shaft to drive the shaft.

A handle 130 (Fig. 5) conveniently accessible at the left hand end of the machine, has a forked end 131 (Fig. 2) for shifting the clutch part 129 to control the rotation of the driven shaft. This shaft, at the opposite end of the machine, is equipped with the usual hand wheel 132 by means of which it may be rotated for setting up and adjusting the machine. This main shaft 60 carries the several clutch units for controlling the successive movements of the horizontal turret, the turret and cross slides, and the devices for operating the work spindle, such clutch units being operated by trip levers actuated by dogs mounted on carrier wheels fixed on the cross slide cam shaft extending along the front side of the machine, which will now be described.

Fixed on the main shaft adjacent the hand wheel is a gear 133 (Fig. 1) which drives a train of change speed gears, indicated generally at 134, of the usual or any suitable variety, as well understood in the art, and forming no part of the present invention. This gear train drives a gear 135 fixed on a transmission shaft 136 extending along the rear side of the machine. Fixed on this shaft is a worm 137 which drives a worm wheel 138 fixed on lead cam shaft 38. The opposite end of shaft 136, adjacent the left hand end of the machine (Fig. 2) has fixed thereon a bevel gear 139 mating with a gear 140 fixed on a shaft 141 (Fig. 5), which extends across the end of the machine to the front side, where it drives a worm gear 142 meshing with a worm wheel 143 fixed on the said cross slide cam shaft 104 extending along the front side of the machine.

The cross slide cam shaft has fixed thereon a series of wheels or carriers on which are mounted the dogs for tripping a series of pivoted trip levers, extending across to the rear side of the machine and provided at their opposite or rear ends with means for actuating the several clutches referred to above, as best shown in Figs. 3, 5 and 6. Fixed on the right hand end of the said shaft 104 is a trip dog carrier 144 for controlling the horizontal turret and slide, the description of which will apply to the cross slide and other carriers of the series on the shaft. Carrier 144 is a wheel formed in one side face with a T slot 145 (Figs. 3 and 6), having an entrance at 146, and in which are anchored the bolts 147 for clamping on each carrier one or more trip dogs 148. Each dog is thus adjustably bolted on any desired point on the periphery of the carrier, which may be marked with an appropriate scale (not shown) for so positioning the dog. Each dog has a cam-shaped projection 149 for engaging and lifting a cam-shaped finger 150 fixed adjacent the end of a corresponding trip lever 151.

Carrier 144, which controls the motion of the horizontal turret slide and its indexing mechanisms, is provided with a plurality of dogs, corresponding to the plurality of tools, as indicated in Fig. 6. This carrier is constructed, therefore, to receive such dogs on each of its opposite faces, for cooperation with a pair of trip fingers 150, one on each side of the lever, which facilitates the convenient adjustment of the dogs in any desired location on the carrier. The opposite end of trip lever 151 is broken away in Fig. 6 but is shown in Fig. 7 adjacent Fig. 6, as carrying an abutment in the form of a stud or spur tooth 152 engaging in a slot 153 formed circumferentially in a clutch part 154 mounted to rotate and slide longitudinally on shaft 60 (Figs. 1, 9 and 10). Clutch part 154 has a tongue 155 sliding longitudinally of the shaft in a groove 156 in a sleeve 157 rotating on the shaft and in a bearing 158 on the main frame. The sleeve has fixed thereon a gear 159 for driving the mechanisms of the horizontal turret.

Housed in recesses in gear 159 are one or more springs 160 pressing against a side face of the clutch part 154 for sliding it longitudinally of the shaft to engage its opposite clutch face 161 with the clutch face 162 on a complementary clutch part 163 which is keyed on the main shaft. The slot 153 in the clutch part 154 has a portion 164 (Fig. 9) inclined longitudinally of the main shaft, which portion, in one position, strikes stud 152 on trip lever 151, thus shifting the clutch part downwardly in Fig. 9 and toward the left in Fig. 1, against spring 160, so as to disengage the clutch face, the parts then being in the position shown in Figs. 7 and 9. Slot 153 contains an elevated stop portion 165 (Fig. 7) positioned to engage stud 152, in the disengaged position of the clutch and positively stop the rotation of this clutch part, if not stopped, as normally the case, by a spring actuated detent hereafter described.

When one of the dogs 148 raises the forward end of lever 151 and lowers its rear end, the abutment or stud 152 is withdrawn from slot 153 and spring 160 slides the clutch part longitudinally into engagement with the clutch part 163 fixed on the shaft, thus driving the gears 159 and 58 and shaft 59, and the turret slide and mechanisms driven thereby.

To prevent any clashing of the clutch teeth, cam slot 153 is provided also with an inclined portion 166 formed on the side face of a rib portion 167 of greater radius than the part 165, so as to strike stud 152 while the stud is withdrawn from slot 153, and assist spring 160 in shifting clutch part 154 into engagement with the mating clutch part. The trip lever is quickly released by its dog, however, and thereafter returned by a spring plunger 168 (Fig. 1) mounted on the frame, so that stud 152 reenters slot 153 for repetition of the cycle. This particular clutch part rotates through one revolution with the main shaft before being disengaged, such motion being sufficient for an operation of the mechanism controlling the movements of the turret tools. Clutch part 154 is provided also with a V-shaped notch 169 (Figs. 9 and 10) for cooperation with a spring actuated detent finger 170 (Fig. 1) to arrest and position the clutch and associated parts between actuations thereof.

The rear cross slide is actuated by the next adjacent carrier 171 (Fig. 3) on the carrier shaft 104, the carrier being provided with one or more dogs for tripping a lever 172 (Fig. 6), pivotally mounted on the same longitudinal shaft 173 as the above trip lever 151. These parts have substantially the same construction as already described in connection with the carrier and trip lever for the horizontal turret. Lever 172 carries at its rear end a similar stud 174 (Fig. 6) for coaction in the same way with a similar clutch part 175, rotatably and slidably mounted on shaft 60. This clutch part is arranged for driving engagement with the opposite face of the said clutch part 163 fixed on the shaft and has a splined driving connection with a sleeve 176 rotating on the shaft, the sleeve having fixed thereon the said gear 123 for actuating gear 121 and the cross slide toggle crank 119 described above. In this instance, the clutch part 175 is engaged twice during each revolution of the main shaft, for one half of a revolution at each engagement, to advance and retract the cross slide during each operating cycle. This is indicated by the construction of the clutch part 175 in Fig. 6, where its cam slot 177 for the trip lever stud is formed with two diametrically opposite stop portions 178 and 179, one adjacent each of the inclined portions of the slot which coact with the trip lever stud to engage and disengage the clutch part, as described above in connection with the corresponding clutch for the horizontal turret slide.

The front cross slide is actuated by a trip dog carrier 180 fixed on shaft 104 at a point still farther toward the left as viewed in Fig. 5, for actuating a corresponding trip lever 181. This carrier and lever both have substantially the same construction as described above in connection with the turret slide and rear cross slide, and the trip lever controls, in the same way, a similar clutch part 182 cooperating with a clutch part 183 fixed on the main shaft. This shiftable clutch part is keyed or splined to a sleeve 184 rotating on the main shaft and in a bearing on the frame, as shown. Keyed on the other end of the sleeve is the said gear 122 for driving gear 120 and the crank 118 of the front slide. As this trip dog and actuated mechanism are constructed and operate in substantially the same way as those previously described, a more detailed reference thereto is unnecessary.

The next adjacent trip dog carrier on shaft 104 is carrier 185 (Fig. 5) provided for actuating trip levers 186 and 187 for actuating vertical plungers 188 and 189, respectively, comprising parts of a mechanism for shifting a shipper lever 190 and clutch 191 for reversing and changing the speed of the work spindle which, however, form no part of the present invention, and need not be described.

The next adjacent trip dog carrier 192 is provided for actuating a vertical turret (not shown), when employed on the machine, but as the same forms no part of the present invention, further reference thereto is not required.

The last trip dog carrier 193 operates a trip lever 194 for shifting a clutch part, such as described above, for driving a cam drum 195 (Figs. 2) employed to control a shipper lever 196 for operating the usual work collet and also an adjustable block and guide device, indicated generally at 197, for actuating the usual work feed finger, as well understood in the art and forming no part of this invention.

The invention further comprises improved means for supporting those ends of the several trip dog levers which operate the spring actuated clutch parts on the main shaft. As will be seen, for example, in Fig. 6, these levers extend for a substantial distance on opposite sides of the shaft on which they are mounted. The forward ends of these levers are subjected to pivotal actuation only by the trip dogs, but the rear ends are subjected to the lateral and other stresses imposed by operating engagement with the spring actuated, rotating clutch parts and the spring plunger means shown at 198 for urging the lever ends into such engagement with the clutch parts. We have devised a simple, accessible and effective means for supporting the rear ends of the levers against such operating stresses, comprising, preferably, a bracket means detachably mounted on the main frame and carrying adjustable abutments for supporting the lever ends in proper position against such stresses.

This trip lever supporting means comprises, preferably, a series of brackets, one opposite the rear end of each trip lever. As these brackets are substantially alike, a description of one will suffice for all. One bracket 199 (Figs. 1 and 6), for example, is of generally T shape, the main stem of which is detachably secured by bolts 200 to the main frame. The bracket has a rearwardly and upwardly projecting free end terminating in a laterally extending arm 201 on one or both sides thereof, each extending over the rear end of one of the trip levers, as lever 151, as shown. The main body or stem of the bracket is tapped, on one or both sides, to receive a threaded stud 202 projecting laterally therefrom with its head in abutting contact with the side face of trip lever 151 opposite the side thereof on which the thrusting force of the spring actuated clutch part 154 is imposed. Stud 202 may be threaded into and out of its socket in the side face of the bracket to adjust it for precise supporting engagement with the lever, and the stud is preferably locked in adjusted position by means of a set screw 203. Such means provides a continuous, rigid support for the trip lever at that portion of it which actuates the clutch part against the action of its spring, so as to obviate any tendency to cock or deform the lever.

Bracket 199 is provided also with means for adjustably supporting the end of the trip lever against the upward thrusting action of the spring plunger 198 and with its stud properly positioned for coaction with the cam slot 153 of the corresponding clutch part. To this end, the laterally projecting upper ends 201 of the bracket are formed with a vertically threaded opening, each adjustably receiving a set screw 204, as shown. It will thus be seen that this set screw affords an adjustable but rigid abutment for supporting the lever end against the thrust of its spring actuated plunger and preventing the transmission of such thrust to the rotatable clutch part. The lever end is thus fully and precisely supported against the forces imposed thereon and substantially at the point of application of such forces, thus effectively obviating any cocking or deformation of the trip lever.

Bracket 199, by the similar adjustable stops on its opposite side, similarly supports the end trip lever 172. A single bracket 205 of the same construction is provided for the other cross slide trip lever 181 (Fig. 2) and a double bracket 206 is provided for supporting the said trip levers for the vertical turret, when employed, and for the trip lever 194 for the work spindle collet and feed mechanism. It will be apparent that in the setting up of the machine, as well as in any repairs or replacements, these several supporting brackets may be readily removed to afford convenient access to the trip lever rear ends and cooperating and adjusting parts. When the brackets are remounted on the frame, the adjustably threaded stop parts 202 and 204 may be accurately positioned to closely back up and support the trip lever ends.

Means are provided for arresting the rotation of the clutch parts on the main shaft, after they have completed their respective operations and have been released by the trip levers from driving engagement with the shaft. Such means are preferably the same for each trip lever and clutch and will be described for convenience as employed in connection with trip lever 194 for controlling the work spindle parts, since these parts are clearly shown in Figs. 8 and 11 and as viewed from the right hand end of the machine in Fig. 2. Such detent means preferably comprises, for each trip lever, as 194, a companion lever 207 (Fig. 8) pivotally mounted on shaft 173 on the main frame. Lever 207 extends rearwardly from its shaft and terminates short of its companion trip lever 194 but with its end lying below the clutch part 193 on the main shaft 60. This end of lever 207 carries an upwardly projecting bevelled detent stud 208 for cooperation with a notch 209 formed in the periphery of the clutch part 193. Stop lever 207 is urged toward the clutch part by a spring actuated plunger 210. The lever is provided, however, with a lug 211 located below a cooperating lug 212 on the companion trip lever 194, so that, when the latter is tripped by its dog, it depresses lever 207, by means of these lugs, so as to withdraw detent 208 from the notch in the clutch part at the same time that the clutch part is released by the trip lever stud for engagement with the drive shaft. The detent 208 then rides on the full surface of the clutch part until the latter completes a revolution, when the detent, under actuation by the spring plunger 210, snaps again into the notch in the clutch part and arrests the rotation of such part and its associated members. This mechanism operates rapidly, without shock to the parts and retains the clutch part precisely in its disengaged position and in proper relation with the stud of the trip lever until the latter is again tripped.

This detent device is preferably employed, as stated, in connection with each of the several trip levers and cam parts controlled thereby. Such detent means for the rear cross slide mechanism, for example, is indicated in conjunction with trip lever 172 in Fig. 1. For the front cross slide mechanism, it is indicated in conjunction with the trip lever 181 in Figure 2 of the drawings. Since the cross slide clutches rotate through half of a revolution at each actuation, however, their clutch parts are preferably provided with two such detent notches located on opposite sides of the clutch part.

The brackets 199, 205 and 206 for supporting the rear ends of the trip levers are utilized for the further purpose of supporting casing parts for housing portions of the machine. To this end, the lower portion of bracket 199 is formed with thickening bosses 213 (Fig. 1) having an opening therethrough in which is received and supported a bar 214 projecting at both ends beyond the bracket. The other brackets are similarly equipped and parts of the casing or housing of the machine, as best shown at 215 (Fig. 11), carry hooked arms 216 arranged to be detachably engaged over either or both ends of the bar 214 of each bracket, as an advantageous means of supporting the lower ends of such casing portions, which are provided with additional means for supporting the same on the frame adjacent their tops, as by means of a projecting pin 217.

The operation of the various parts of the machine will be apparent from the above description. As the main shaft is rotated by its motor, it drives, through its gear and shaft connections, the cross slide cam shaft 104 which mounts also the various trip dog carriers. The horizontal turret in indexed and rapidly advanced to present one of its tools in preliminary or operating position, by means of the crank on the turret slide. The selector disk assembly is correspondingly indexed to connect with the slide the lead cam corresponding to the tool in operating position and through the actuator rod 34 thereby selected, the required portion of the lead cam contour produces feeding actuation of the tool. The turret slide is then rapidly withdrawn by its crank mechanism for repetition of the cycle.

At the desired points in the forming of the work piece, the cross slides are operated in accurately timed relation with the other operations of the machine and in the same rapid fashion. To this end, the trip dogs are positioned on the carriers on shaft 104 so as to operate the trip levers in timed relation with the operation of the cross slide cams 103 and 111. The trip levers release their respective driven clutch parts for actupation by their springs into instant engagement with the driving clutch parts, thus actuating cranks 118 and 119 through a half revolution. By means of links 112 and 113, the toggle levers 84 are quickly straightened to rapidly advance the cross slides to preliminary position, at which point the said cams take up the feeding actuation of the cross slides and their tools. By properly positioning the trip dogs, the cam connections are established so as to utilize only the rising portions of the contour required for the feeding advance of the tools, after which the toggles are broken to rapidly retract the slides, by succeeding operations of the trip levers, clutches and cranks described for that purpose. Such means provide for operation of the cross slides with a minimum requirement of time and interference with the other coordinated operations of the machine. The various adjustments described are readily accessible and afford complete control over the range and amplitude of movement of the cross slides. By means of the novel construction of the clutch parts actuated by the trip levers, such parts are positively moved by the inclined portions 164 and 166 of their cam grooves 153 (Fig. 9), thus speeding up the operation of the clutches and avoiding any clashing or chattering of the clutch parts against each other. In such actuation of the clutch parts, the trip levers are completely supported by the brackets 199, 205 and 206 and their adjustable abutments, which may be readily removed, however, for access thereto.

It will thus be seen that the invention accomplishes its objects, and while it has been herein disclosed by detailed description of a preferred embodiment, it is to be understood that such disclosure is intended in an illustrative, rather than a limiting sense, as it is contemplated that various modifications and changes in the construction and arrangement of the parts will readily occur to those skilled in the art within the spirit of the invention and the scope of the appended claims.

We claim:

1. In an automatic screw machine having a frame and a work spindle thereon, the combination with said frame of a pair of tool cross slides movable on opposite sides of said frame, respectively, toward and from said spindle, a lever pivoted on said frame and connected with each slide, operating cam means for each slide, a pair of toggle links pivotally connected with said cam means and said lever, respectively, and having a pivotal knee connection with each other, and means for operating said cam means and said pairs of toggle levers for actuating said slides.

2. In an automatic screw machine having a frame and a work spindle thereon, the combination with said frame of a pair of tool cross slides movable on opposite sides of said frame, respectively, toward and from said spindle, a lever pivoted on said frame and connected with each slide, cam means for operating each slide, a pair of toggle links pivotally connected with each cam means and lever and having a pivotal knee connection with each other, a pair of cranks rotatably mounted on said frame, rods connecting said cranks with said toggle means, respectively, and means for actuating said cam means and cranks.

3. In an automatic screw machine having a frame and a work spindle thereon, the combination with said frame of a pair of tool cross slides movable on opposite sides of said frame, respectively, toward and from said spindle, a link pivoted to each slide, a lever pivoted on said frame and pivotally connected to each link, cam means for each slide, a pair of toggle links on each side of said frame pivotally connected with said cam means and with said lever and having a pivotal knee connection with each other, a pair of cranks rotatable on said frame between said toggle links, rods connecting said cranks with said toggle means, respectively, and means for actuating said cam means and said cranks for moving said slides.

4. In an automatic screw machine, a frame, a rotary work spindle thereon, a pair of tool cross slides movable on opposite sides of said frame, respectively, transversely of said spindle, a link pivoted to each slide, a lever pivoted on said frame and pivotally connected with each link, cam means for actuating each slide, a pair of toggle links pivotally connected with said cam means and lever of each slide and having a pivotal knee connection with each other, a crank for each slide rotatable on said frame, rods connecting said cranks with said toggle means, respectively, clutch means for operating said cranks, trip means for operating said clutch means, and mechanism for actuating said cam means and trip means.

5. In an automatic screw machine, a frame, a rotary work spindle thereon, a pair of tool cross slides movable on opposite sides of said frame transversely of said spindle, a lever pivoted on said frame and connected with each said cross slide, a drive shaft on said frame, cam means on said shaft for each cross slide, a pair of toggle links pivotally connected to said cam means and lever for each cross slide and having a pivotal knee connection with each other, a pair of cranks on said frame for said cross slides, respectively, clutch means for operating each crank, a trip lever for operating each clutch, and a carrier on said shaft having a dog for tripping each trip lever.

6. In an automatic screw machine, a frame, a tool slide movable on said frame, a shaft on said frame, a carrier on said shaft, a trip dog having a peripherally adjustable mounting on said carrier, a lever pivoted on said frame and provided adjacent one end with trip means for actuation by said dog, mechanism for actuating said slide comprising a clutch, spring means for moving said clutch to active position, means arranged on the opposite end of said lever for engaging and actuating said clutch against said spring means in a lateral direction substantially parallel with the pivotal axis of said lever, a bracket removably mounted on said frame, and abutment means adjustably mounted on said bracket for lateral engagement with the clutch actuating end of said lever in opposition to the thrust of said spring means, for supporting said lever against the lateral thrusting action of said spring means.

7. In an automatic screw machine, a frame, a tool slide movable on said frame, a shaft on said frame, a carrier on said shaft, a trip dog having a peripherally adjustable mounting on said carrier, a lever pivoted on said frame and provided adjacent one end with trip means for actuation by said dog, mechanism for operating said slide comprising a spring actuated clutch, means on the opposite end of said lever for moving said clutch against said spring actuation thereof, spring actuated means on said frame for moving said lever into clutch engaging position, and a removable bracket on said frame provided with adjustable means for engagement with said lever to support the same against the action of said spring means.

8. In an automatic screw machine, a frame, a tool slide movable on said frame, a shaft on said frame, a carrier on said shaft, a trip dog having a peripherally adjustable mounting on said carrier, a lever pivoted on said frame and provided adjacent one end with trip means for actuation by said dog, mechanism for operating said slide comprising a clutch, spring means for moving said clutch, means on the opposite end of said lever for moving said clutch in opposition to said spring actuation thereof, spring actuated means on said frame for moving said lever to engage said clutch, a bracket removably mounted on said frame, and thrust elements adjustably threaded in said bracket for engagement with said lever adjacent said clutch to support the same against the thrusting action of said spring means thereon.

9. In an automatic tool machine, a tool movable toward and from the work, mechanism for moving said tool comprising rotatable driving and driven clutch parts, said driven part being formed with a circumferentially extending cam track provided with portions for moving the same in opposite directions into and out of engagement with said driving clutch part, an abutment for cooperation with said cam track, and means actuated by said mechanism independently of said cam track for moving said abutment to position for engaging and actuating one portion of said cam track for positively moving said driven part into clutching engagement and for subsequently moving said abutment to position for engaging and moving another portion of said cam track for positively moving said driven part out of engagement with said driving clutch part, for effecting the movements of said tool.

10. In an automatic tool machine, a tool movable toward and from the work, mechanism for moving said tool comprising a driving clutch part and a driven clutch part movable into and out of engagement with said driving part, spring means for moving said driven part into engagement, said driven part being formed with oppositely inclined cam faces, an abutment for cooperation with said cam faces, and means actuated by said mechanism independently of said cam faces for moving said abutment to position for engaging and moving one of said cam faces to positively move said driven part into clutching engagement and for subsequently moving said follower to position for engaging and moving the other of said cam faces for positively moving said driven part out of clutching engagement against the action of said spring means, for effecting the movements of said tool.

11. In an automatic tool machine, a tool movable toward and from the work, mechanism for moving said tool comprising rotary driving and driven clutch parts, said driven part being movable into and out of engagement with said driving part, spring means for moving said driven part into engagement, said driven part being formed with oppositely inclined cam faces spaced from each other circumferentially of said driven part and located at different radial distances from the rotary axis thereof, an abutment for cooperation with said cam faces, resilient means for moving said abutment to position for cooperation with one of said cam faces during rotation of said driven part to positively move said part out of clutching engagement against the action of said spring means, and means actuated by said mechanism for subsequently moving said abutment to position for cooperation with the other of said cam faces for assisting said spring means in moving said part into clutching engagement, for effecting the movements of said tool.

12. In an automatic screw machine having a tool movable toward and from the work, mechanism for moving said tool comprising rotary driving and driven clutch parts, said driven part being movable into and out of engagement with said driving part, spring means tending to move said driven part into engagement, said driven part being formed with oppositely inclined cam faces spaced from each other circumferentially of said driven part and located at different radial distances from the rotary axis thereof, an abutment for cooperation with said cam faces, means actuated by said mechanism for moving said abutment radially to position for cooperation with one of said cam faces during rotation of said driven part to positively move said part out of engagement with said driving part, and means actuated by said mechanism for subsequently moving said abutment radially to position for cooperation with the other of said cam faces for positively moving said driven part into engagement with said driving part to effect movement of said tool.

FREDERICK G. SILVA.
WRAY S. SEYMOUR.